(12) United States Patent
Fauteux et al.

(10) Patent No.: US 6,416,901 B1
(45) Date of Patent: Jul. 9, 2002

(54) ELECTROCHEMICAL CELL HAVING AN INTERFACE MODIFYING COMPONENT AND ASSOCIATED FABRICATION PROCESS

(75) Inventors: Denis G. Fauteux; Eric S. Kolb, both of Acton, MA (US)

(73) Assignee: Mitsubishi Chemical Corporation (JP)

( * ) Notice: Subject to any disclaimer, the term of this patent is extended or adjusted under 35 U.S.C. 154(b) by 0 days.

(21) Appl. No.: 09/348,601

(22) Filed: Jul. 6, 1999

(51) Int. Cl.$^7$ ............................................... H01M 4/60
(52) U.S. Cl. ...................... 429/215; 429/209; 429/212; 429/217; 429/218.1; 429/231.1; 429/231.9; 429/231.95; 429/232; 429/302; 429/303; 429/307; 429/325
(58) Field of Search ............................. 429/209, 212, 429/217, 218.1, 231.1, 231.9, 231.95, 232, 302, 303, 307, 325

(56) References Cited

U.S. PATENT DOCUMENTS

| | | | |
|---|---|---|---|
| 4,925,749 A | * | 5/1990 | Wright ........................ 429/104 |
| 5,342,710 A | | 8/1994 | Koksbang |
| 5,387,479 A | | 2/1995 | Koksbang |
| 5,399,447 A | | 3/1995 | Chaloner-Gill et al. |
| 5,503,946 A | | 4/1996 | Fauteux et al. |
| 5,573,396 A | | 11/1996 | Swanson |
| 5,856,045 A | * | 1/1999 | Fauteux et al. .............. 429/232 |
| 6,045,937 A | * | 4/2000 | Kolb et al. .................... 429/59 |
| 6,087,045 A | * | 7/2000 | Fauteux et al. .............. 429/245 |

* cited by examiner

*Primary Examiner*—Carol Chaney
*Assistant Examiner*—Dah-Wei D. Yuan
(74) *Attorney, Agent, or Firm*—Factor & Partners

(57) ABSTRACT

An electrode for use in an electrochemical cell comprising a current collector, an electrode active material layer, and means for substantially increasing surface compatibility between the electrode active material layer and at least one of the current collector and an associated electrolyte. The surface compatibility increasing means includes at least a portion of the electrode active material layer associated with an interface modifying component, such as the product of a hydrosilated allylether.

10 Claims, 1 Drawing Sheet

US 6,416,901 B1

ELECTROCHEMICAL CELL HAVING AN INTERFACE MODIFYING COMPONENT AND ASSOCIATED FABRICATION PROCESS

BACKGROUND OF THE INVENTION

1. Field of the Invention

The present invention relates in general to electrode materials, and more particularly, to an electrode active material layer having an interface modifying component which increases, among other things, surface compatibility between the active material layer and the current collector as well as the electrolyte.

2. Background Art

Electrochemical cells having electrode active materials applied to a current collector have been known in the art for years. Conventionally, the electrode active material is suspended or held together by a surrounding binder material. The binder material is commonly a polymeric compound, such as PTFE or PVDF. While electrode active materials suspended in such compounds have been readily utilized in the industry, their surface incompatibility with the current collector has remained largely problematic. In particular, conventional binders of the electrode active materials insufficiently adhere to the current collector resulting in a battery with less than optimal electrochemical performance characteristics. Moreover, the surface of conventional electrode active material layers is not readily wettable, which further adversely affects the battery's electrochemical performance.

It is therefore an object of the present invention to provide an electrode structure and an associated fabrication process that remedies, among other things, the aforementioned detriments and/or complications associated with conventional electrode compositions.

SUMMARY OF THE INVENTION

The present invention is directed to an electrode for use in an electrochemical cell comprising a current collector, an electrode active material layer and means for substantially increasing surface compatibility between the electrode active material layer and at least one of the current collector and an associated electrolyte, wherein the surface compatibility increasing means includes at least a portion of the electrode active material layer associated with an interface modifying component, such as the product of a hydrosilated allylether.

In another preferred embodiments of the invention, the electrode further includes means for substantially increasing adhesion between the electrode active material layer and the current collector as well as means for substantially increasing compatibility between the current collector and an associated electrolyte. In these embodiments the increasing means comprises the interface modifying component comprising the product of a hydrosilated allylether.

The present invention is also directed to a process for manufacturing an electrochemical cell comprising the steps of: a) fabricating a first electrode comprising the steps of: 1) fabricating a current collector; 2) fabricating an interface modifying component preferably comprising the product of a hydrosilated allylether; 3) associating the interface modifying component with at least a portion of an electrode active material; and 4) applying the electrode active material to the current collector; b) fabricating a second electrode; and c) associating at least one electrolyte with the first and second electrodes.

In a preferred embodiment of the invention, the step of fabricating the second electrode includes the steps of: a) fabricating a current collector; b) associating an interface modifying component preferably comprising the product of a hydrosilated allylether with the electrode active material; and c) applying the electrode active material to the current collector.

BRIEF DESCRIPTION OF THE DRAWINGS

The invention will now be described with reference to the drawings wherein.

DETAILED DESCRIPTION OF THE DRAWINGS

Figure 1:
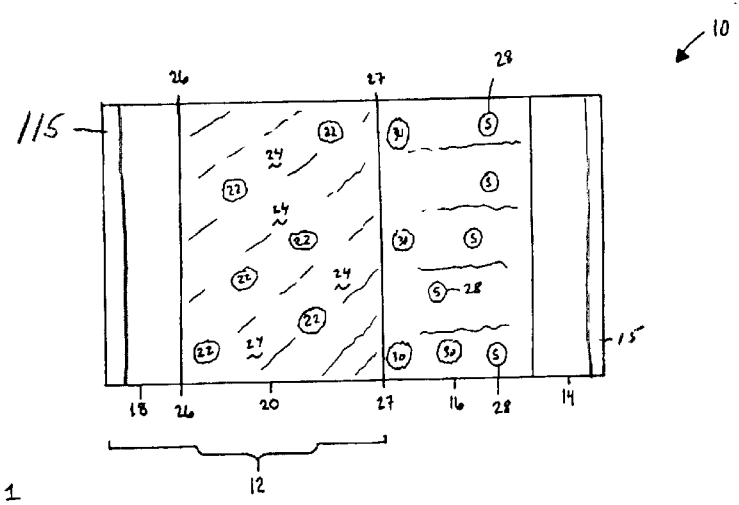
FIG. 1 of the drawings is a schematic representation of a prior art electrochemical cell showing the interfaces between the electrode active material and both the current collector and electrolyte.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

Prior art electrochemical cell 10 is shown in FIG. 1 as generally comprising first electrode 12, second electrode 14, and electrolyte 16. Second electrode 14 is an anode fabricated from a carbonaceous material, such as graphite or carbon black and is deposited onto copper current collector 15. Electrolyte 16 includes a conventional salt, such as $LiPF_6$ or $LAsF_6$, dissolved in a commercially available solvent 28, such as propylene carbonate (PC) or ethylene carbonate (EC). First electrode 12 is a cathode and comprises an aluminum current collector 18 and electrode active material layer 20. Electrode active material layer 20 includes metallic components 22, such as $LiNiO_2$, $LiCoO_2$ and/or $LiMn_2O_4$, surrounded by binder material 24, such as PVDF.

Inasmuch as the native surface of electrode active material layer 20 is not readily compatible with the surface of current collector 18, there is poor adhesion at interface 26 between components 18 and 20, respectively. The poor adhesion at interface 26 is known to adversely affect the electrochemical performance of cell 10. Furthermore, inasmuch as the native surface of electrode active material layer 20 is not readily compatible, or soluble with solvent 28 in electrolyte 16, the electrochemical performance of cell 10 is further adversely affected.

Figure 2:
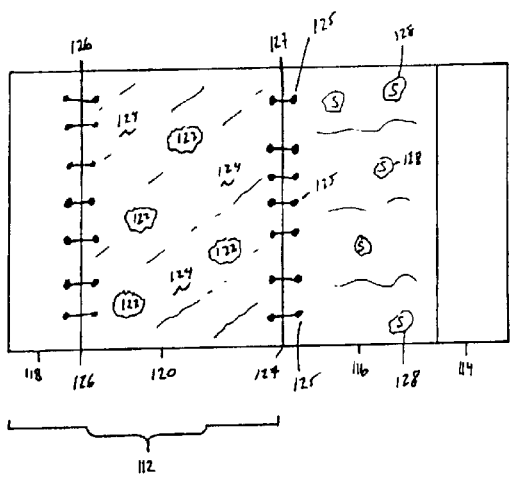
FIG. 2 of the drawings is a schematic representation of an electrochemical cell prepared in accordance with the present invention showing the interfaces between the electrode active material and both the current collector and electrolyte.

Electrochemical cell 100 of the present invention is shown in FIG. 2 as generally comprising first electrode 112, second electrode 114, and electrolyte 116. Second electrode 114 is an anode and is fabricated, for illustrative purposes only, from a carbonaceous material, such as graphite or carbon black and is deposited onto copper current collector 115. Electrolyte 116 includes a conventional salt, such as $LiPF_6$ or $LiAsF_6$, dissolved in an conventional solvent, such as propylene carbonate (PC) or ethylene carbonate (EC).

First electrode 112 is a cathode and includes aluminum current collector 118 and electrode active material layer 120. Electrode active material layer 120 includes metallic components 122, interface modifying component 125, and binder material 124. For purposes of the present disclosure, metallic components 122 may be fabricated from, for example, $LiCoO_2$, $LiNiO_2$, and/or $LiMn_2O_4$. Binder 124 at least partially surrounds metallic components 122 and is preferably fabricated from a polymeric binder, such as, commercially available KRATON (D1101 or D1116) (Styrene/Butadiene copolymer). While KRATON (Styrene/Butadiene copolymer) binders have been disclosed, for illustrative purposes only, other binders known to those having ordinary skill in the art are likewise contemplated for use.

Interface modifying component 125 is preferably the product of a hydrosilated allylether. Such a hydrosilylation mechanism adds functional groups to the allylether, and in turn, modifies the properties of the associated electrode active material. These functional groups, among other things, increase the surface compatibility between current collector 118 and electrode active material layer 120 at interface 126. The increased compatibility substantially improves adhesion between components 118 and 120, and in turn, improves the electrochemical performance of cell 100. Moreover, the functional groups accommodated by interface modifying component 125 increase the compatibility/wettability of interface 127 between electrode active material layer 120 and electrolyte 116. Such an increase in compatibility further improves the electrochemical performance of cell 100.

While interface modifying component 125 has been disclosed, for illustrative purposes only, as being associated with a cathode having lithiated transition metals deposited onto the surface of an aluminum current collector, it will be understood that the interface modifying component may also be associated with an anode having carbonaceous material deposited onto the surface of a copper current collector.

In addition, while hydrosilylation of an allylic species has been disclosed, for illustrative purposes only, as one mechanism for adding functional groups to an associated electrode active material layer, other functional group additions that would be known to those having ordinary skill in the art are likewise contemplated for use.

Indeed, in support of the present invention the following experiment was conducted.

First solution "A" was prepared by charging the following reagents into a flask: 1)≈30.0 g of KRAYTON (D1101) (Styrene/Butadiene copolymer) binder 10% (by wt.) in toluene; 2)≈0.3 g of tetradimethylsiloxysilane; and 3)≈0.3 g of Allylether of triethylene glycol monomethylether.
Second, solution "B" was prepared by charging the following reagents into a flask:
1)≈11.0 g of toluene, and
2)≈0.1 g of platinum catalyst.
Third, the following reagents were charged into a mixing vessel:
1)≈46.5 g of $LiCoO_2$;
2)≈20.0 g of Solution A;
3)≈1.0 g of carbon; and
4)≈20.0 g of toluene.
Fourth, the combined reagents were ball-milled (mixed) for approximately 12 hours. Fifth, approximately 1.0 g of solution B was charged into the mixing vessel and the reagents were thoroughly agitated. Sixth, the resulting mixture was coated onto a current collector and cured via conventional thermal energy. As was readily observed, a visual increase in the wettability of the electrode was realized when PC was readily absorbed onto the surface of the electrode. Moreover, although not quantitatively tested, the electrode active material adhered substantially better to the current collector than did conventional electrode active material.

The foregoing description and drawings merely explain and illustrate the invention and the invention is not limited thereto except insofar as the appended claims are so limited, as those skilled in the art who have the disclosure before them will be able to make modifications and variations therein without departing form the scope of the invention.

What is claimed is:

1. An electrode for use in an electrochemical cell comprising:

a current collector;

an electrode active material layer; and means for increasing surface compatibility between the electrode active material layer and at least one of the current collector and an associated electrolyte, wherein the surface compatibility increasing means includes at least a portion of the electrode active material layer associated with an interface modifying component, wherein the interface modifying component comprises the product of a hydrosilated allylether.

2. An electrode for use in an electrochemical cell comprising:

a current collector;

an electrode active material layer;

means for increasing surface compatibility between the electrode active material layer and at least one of the current collector and an associated electrolyte, wherein the surface compatibility increasing means includes at least a portion of the electrode active material layer associated with an interface modifying component; and means for increasing adhesion between the electrode active material layer and the current collector, wherein the adhesion increasing means comprises the interface modifying component being fabricated from the product of a hydrosilated allylether.

3. An electrode for use in an electrochemical cell comprising:

a current collector;

an electrode active material layer; and means for increasing surface compatibility between the electrode active material layer and at least one of the current collector and an associated electrolyte, wherein the surface compatibility increasing means includes at least a portion of the electrode active material layer associated with an interface modifying component; and means for increasing wettability between the current collector and an associated electrolyte.

4. The electrode according to claim 3, wherein the wettability increasing means comprises the interface modifying component being fabricated from the product of a hydrosilated allylether.

5. An electrochemical cell comprising:

an electrolyte;

a first electrode and a second electrode wherein at least one of the first and second electrodes comprises:

a current collector;

an electrode active material layer; and means for increasing surface compatibility between the electrode active material layer and at least one of the current collector and the electrolyte, wherein the surface compatibility increasing means includes at least a portion of the electrode active material layer associated with an interface modifying component, wherein the interface modifying component comprises the product of a hydrosilated allylether.

6. An electrochemical cell comprising:

an electrolyte;

a first electrode and a second electrode wherein at least one of the first and second electrodes comprises:

a current collector;

an electrode active material layer;

means for increasing surface compatibility between the electrode active material layer and at least one of the current collector and the electrolyte, wherein the surface compatibility increasing means includes at least a portion of the electrode active material layer associated with an interface modifying component; and means for increasing adhesion between the electrode active material layer and the current collector, wherein the adhesion increasing means comprises the interface modifying component being fabricated from the product of a hydrosilated allylether.

7. An electrochemical cell comprising:

an electrolyte;

a first electrode and a second electrode wherein at least one of the first and second electrodes comprises:

a current collector;

an electrode active material layer;

means for increasing surface compatibility between the electrode active material layer and at least one of the current collector and the electrolyte, wherein the surface compatibility increasing means includes at least a portion of the electrode active material layer associated with an interface modifying component; and means for increasing wettability between the current collector and an associated electrolyte.

8. The electrochemical cell according to claim 7, wherein the wettability increasing means comprises the interface modifying component being fabricated from the product of a hydrosilated allylether.

9. A process for manufacturing an electrochemical cell comprising the steps of:

fabricating a first electrode comprising the steps of:

fabricating a current collector;

fabricating an interface modifying component by hydrosilating an allylether;

associating the interface modifying component with at least a portion of an electrode active material; and applying the electrode active material to the current collector;

fabricating a second electrode; and associating at least one electrolyte with the first and second electrodes.

10. The process according to claim 9, wherein the step of fabricating the second electrode includes the steps of:

fabricating a current collector;

associating an interface modifying component with an electrode active material; and applying the electrode active material to the current collector.

* * * * *